US010834498B2

(12) United States Patent
Kapinos et al.

(10) Patent No.: US 10,834,498 B2
(45) Date of Patent: Nov. 10, 2020

(54) USING IMAGE DATA TO ADJUST A MICROPHONE SETTING

(71) Applicant: LENOVO (Singapore) PTE. LTD., New Tech Park (SG)

(72) Inventors: Robert James Kapinos, Durham, NC (US); Russell Speight VanBlon, Raleigh, NC (US); Scott Wentao Li, Cary, NC (US); Robert James Norton, Jr., Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/367,138

(22) Filed: Mar. 27, 2019

(65) Prior Publication Data

US 2020/0314535 A1     Oct. 1, 2020

(51) Int. Cl.
*H04R 1/34* (2006.01)
*G06K 9/00* (2006.01)

(52) U.S. Cl.
CPC ......... *H04R 1/342* (2013.01); *G06K 9/00624* (2013.01); *G06K 9/00288* (2013.01)

(58) Field of Classification Search
CPC .... H04R 1/028; H04R 1/406; H04R 2499/11; H04R 1/04; H04R 1/08; H04R 1/326; H04R 2201/025; H04R 2430/01; H04R 3/005; H04R 3/04; H04R 5/027; H04R 5/04; A61B 5/0022; A61B 5/0205; A61B 5/02438; A61B 5/14551; A61B 5/681; A61B 2560/0228; A61B 2562/0219; A61B 5/0024; A61B 5/01; A61B 5/02055; A61B 5/021; A61B 5/02416; A61B 5/0245; A61B 5/0261; A61B 5/04085; A61B 5/0472; A61B 5/0478; A61B 5/0816; A61B 5/1112; A61B 5/6803; A61B 5/6824; A61B 5/7203; A61B 5/721; A61B 5/7221; A61B 5/7264; A61B 5/7275; A61B 5/7282; A61B 5/7455; A61B 5/746; A61B 5/7475; G10L 13/043; G10L 15/24; G10L 21/0208

USPC ....................... 381/92, 103–107, 56–58, 198
See application file for complete search history.

(56) References Cited

U.S. PATENT DOCUMENTS

| 6,757,397 B1* | 6/2004 | Buecher ................... H04R 1/04 348/14.08 |
| 7,084,801 B2* | 8/2006 | Balan ................... G06K 9/0057 341/155 |
| 2010/0166219 A1* | 7/2010 | Marton ................... H04R 3/005 381/98 |
| 2013/0300671 A1* | 11/2013 | Hallerstrom Sjostedt ................... G06F 1/1626 345/173 |
| 2015/0063595 A1* | 3/2015 | Kemppinen ........ H04M 1/6041 381/101 |

(Continued)

*Primary Examiner* — Lun-See Lao
(74) *Attorney, Agent, or Firm* — Kunzler Bean & Adamson (57) ABSTRACT

For using image data to adjust a microphone setting, methods, apparatus, and systems are disclosed. One apparatus includes a camera that captures image data, a directional microphone that captures audio signals, a processor and a memory that stores code executable by the processor. The processor determines a location of a user relative to the apparatus using the image data and adjusts microphone settings for direction-of-amplification based on the location of the user.

20 Claims, 7 Drawing Sheets

(56) References Cited

U.S. PATENT DOCUMENTS

| | | | | |
|---|---|---|---|---|
| 2015/0128075 A1* | 5/2015 | Kempinski | ............. | G06F 3/013 |
| | | | | 715/765 |
| 2018/0076891 A1* | 3/2018 | Agrawal | .............. | H04B 10/116 |
| 2018/0088969 A1* | 3/2018 | VanBlon | ................. | G06F 3/013 |
| 2018/0121712 A1* | 5/2018 | Garrett | ............... | G06K 9/00228 |
| 2018/0329485 A1* | 11/2018 | Carothers | ............... | G06T 7/536 |

\* cited by examiner

USING IMAGE DATA TO ADJUST A MICROPHONE SETTING

FIELD

The subject matter disclosed herein relates to microphones and more particularly relates to using image data to adjust a microphone setting.

BACKGROUND

Microphone beamforming algorithms rely on assumptions about the physical location of the user in order to work. Where no data exists about the user's physical relationship to the PC, the assumptions about the physical location of the user may be incorrect.

BRIEF SUMMARY

An apparatus for using image data to adjust a microphone setting is disclosed. A method and computer program product also perform the functions of the apparatus.

One apparatus for using image data to adjust a microphone setting includes a camera that captures image data, a directional microphone that captures audio signals, a processor and a memory that stores code executable by the processor. The processor determines a location of a user relative to the apparatus using the image data and adjusts microphone settings for direction-of-amplification based on the location of the user.

One method for using image data to adjust a microphone setting includes capturing image data by an electronic device and determining, by use of a processor, a location of a user relative to the electronic device based on the image data. The method includes adjusting a direction-of-amplification of a directional microphone based on the location of the user, the electronic device comprising the directional microphone.

A program product comprising a computer readable storage medium that stores code executable by a processor, the executable code comprising code to capture image data via a camera, use the image data to determine a location of a user relative to an electronic device containing the camera and a directional microphone, and adjust a microphone setting for direction-of-amplification based on the location of the user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer readable storage devices storing machine readable code, computer readable code, and/or program code, referred hereafter as code. The storage devices are tangible, non-transitory, and/or non-transmission. The storage devices do not embody signals. In a certain embodiment, the storage devices may employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

For using image data to adjust a microphone setting, methods, systems, and apparatuses are disclosed herein.

Microphone beamforming algorithms rely on assumptions about the physical location of the user in order to work. In the case of clamshell or All-In-One ("AIO") personal computer formats, the user is assumed to be sitting in front of the screen oriented with gravity. However, in the case of tablet-style personal computers which can be placed on a flat surface (e.g., a table top), no data exists about the user's physical relationship to the personal computer. Thus, the beam forming does not know which way to point (e.g., which direction to select in the beamforming algorithms).

Far field pickup microphone solutions will work for anyone in range, but are not suitable for noisy environments or multiple users on different PCs in the same area. Seeking-beamforming yields suitable results after a certain amount of convergence time, such as five seconds. However, unless the user is continuously talking, then the seeking-beamforming microphone may lose the user or may never converge. Fixed-direction beamforming requires the user to always be in a specific position relative to the microphone (e.g., personal computer).

In various embodiments, when the personal computer detects that it is being placed down flat on the table, the camera turns on. From the camera data, the personal computer may use an image recognition algorithm, such as facial recognition, to determine where the logged-in user is in relationship to the personal computer, for example in relation to the computer's top dead center orientation. Having determined this direction, the voice input (microphone) beamforming is adjusted for maximum pickup at the direction of the user, and maximum noise reduction in other directions.

Disclosed herein is an apparatus for using image data to adjust a microphone setting. In various embodiments, the apparatus includes a camera that captures image data, a directional microphone that captures audio signals, a processor and a memory that stores code executable by the processor. The processor determines a location of a user relative to the apparatus using the image data and adjusts microphone settings for direction-of-amplification based on the location of the user.

In various embodiments, the directional microphone is a beamforming microphone. In such embodiments, adjusting microphone settings for direction-of-amplification based on the location of the user may include selecting a beam for the microphone using the location of the user. In some embodiments, the directional microphone is an electronically-adjustable directional microphone. In such embodiments, adjusting microphone settings for direction-of-amplification based on the location of the user may include adjusting a directionality of the directional microphone to acquire audio signals in a direction vector to the user.

In certain embodiments, adjusting microphone settings for direction-of-amplification based on the location of the user includes adjusting one or more of: beam direction aim, beam selection, amplification levels, and interference patterns. In certain embodiments, adjusting microphone settings for direction-of-amplification based on the location of the user includes adapting a different beamforming algorithm. In certain embodiments, adjusting microphone settings for direction-of-amplification based on the location of the user includes amplifying audio pickup in a direction vector pointing to the location of the user and suppressing audio pickup in other direction vectors.

In some embodiments, the directional microphone comprises a linear array of microphone elements. In such embodiments, adjusting microphone settings for direction-of-amplification based on the location of the user comprises adapting a beamforming algorithm for the microphone using the location of the user. In certain embodiments, determining the location of the user relative to the apparatus comprises identifying a direction vector pointing to the user.

In certain embodiments, determining the location of the user relative to the apparatus comprises identifying an angular location of the user relative to the directional microphone. In such embodiments, adjusting microphone settings for direction-of-amplification based on the location of the user comprises estimating an angle-of-arrival ("AoA") of incoming audio signals and increasing microphone sensitivity in the direction of the AoA.

In some embodiments, the apparatus includes an orientation sensor that detects an orientation of the apparatus. In such embodiments, the processor adjusts the microphone settings for direction-of-amplification in response to the orientation sensor detecting that the apparatus is placed on a flat surface. In certain embodiments, the camera captures the image data in response to one of: a change in orientation of the apparatus and a change in operation mode of the apparatus. In some embodiments, the processor further detects a change in user location and re-adjusts the microphone settings for direction-of-amplification in response to the change in user location.

Disclosed herein is a method for using image data to adjust a microphone setting. In various embodiments, the method includes capturing image data by an electronic device, determining (by use of a processor) a location of a user relative to the electronic device based on the image data, and adjusting a direction-of-amplification of a directional microphone based on the location of the user. Here, the electronic device comprises the directional microphone.

In various embodiments, the microphone is a beamforming microphone. In such embodiments, adjusting the direction-of-amplification of the microphone based on the location of the user comprises selecting a beam for the microphone using the location of the user. In various embodiments, the directional microphone comprises an electronically-adjustable directional microphone. In such embodiments, adjusting the direction-of-amplification of the directional microphone based on the location of the user comprises adjusting a directionality of the directional microphone to acquire audio signals in a direction vector to the user.

In certain embodiments, adjusting the direction-of-amplification of the directional microphone based on the location of the user comprises adjusting one or more of: beam direction aim, beamforming algorithm, amplification levels, and interference patterns. In certain embodiments, adjusting the direction-of-amplification of the directional microphone based on the location of the user comprises amplifying audio pickup in a direction vector pointing to the location of the user and suppressing audio pickup in other direction vectors.

In various embodiments, the microphone comprises a linear array of microphone elements. In certain embodiments, adjusting the direction-of-amplification of the microphone based on the location of the user comprises adapting a beamforming algorithm for the microphone using the location of the user. In certain embodiments, determining the location of the user relative to the electronic device comprises identifying a direction vector pointing to the user.

In some embodiments, determining the location of the user relative to the electronic device comprises identifying an angular location of the user relative to the directional microphone, wherein adjusting the direction-of-amplification of the directional microphone based on the location of the user comprises estimating an angle-of-arrival ("AoA")

of incoming audio signals and increasing microphone sensitivity in the direction of the AoA.

In various embodiments, the method includes detecting an orientation of the electronic device, wherein adjusting the direction-of-amplification of the directional microphone occurs in response to the orientation sensor detecting that the electronic device is placed on a flat surface. In some embodiments, capturing the image data occurs in response to one of: a change in orientation of the electronic device and a change in operation mode of the electronic device. In various embodiments, the method includes detecting a change in user location and re-adjusting the direction-of-amplification of the directional microphone in response to the change in user location.

Disclosed herein is a program product for using image data to adjust a microphone setting. In various embodiments, the program product includes a computer readable storage medium that is not a transitory signal and that stores code executable by a processor. Here, the executable code including code to: capture image data via a camera, use the image data to determine a location of a user relative to an electronic device containing the camera and a directional microphone, and adjust a microphone setting for direction-of-amplification based on the location of the user.

In various embodiments, the microphone is a beamforming microphone. In such embodiments, adjusting the microphone setting for direction-of-amplification comprises selecting a beam for the microphone using the location of the user. In various embodiments, the directional microphone comprises an electronically-adjustable directional microphone. In such embodiments, adjusting the microphone setting for direction-of-amplification comprises adjusting a directionality of the directional microphone to acquire audio signals in a direction vector to the user.

In certain embodiments, adjusting the microphone setting for direction-of-amplification comprises adjusting one or more of: beam direction aim, beamforming algorithm, amplification levels, and interference patterns. In some embodiments, adjusting the microphone setting for direction-of-amplification comprises amplifying audio pickup in a direction vector pointing to the location of the user and suppressing audio pickup in other direction vectors.

In various embodiments, the microphone comprises a linear array of microphone elements. In certain embodiments, adjusting the microphone setting for direction-of-amplification comprises adapting a beamforming algorithm for the microphone using the location of the user. In certain embodiments, determining the location of the user relative to the electronic device comprises identifying a direction vector pointing to the user.

In some embodiments, determining the location of the user relative to the electronic device comprises identifying an angular location of the user relative to the microphone array, wherein adjusting the microphone setting for direction-of-amplification comprises estimating an angle-of-arrival ("AoA") of the audio signals based on the angular location and increasing microphone sensitivity in the direction of the AoA.

In some embodiments, the program product includes code to detect an orientation of the electronic device, wherein adjusting the direction-of-amplification of the microphone occurs in response to the orientation sensor detecting that the electronic device is placed on a flat surface. In some embodiments, capturing the image data occurs in response to one of: a change in orientation of the electronic device and a change in operation mode of the electronic device.

In some embodiments, the program product includes code to detect a change in user location and re-adjusting the direction-of-amplification of the microphone in response to the change in user location.

Figure 1:
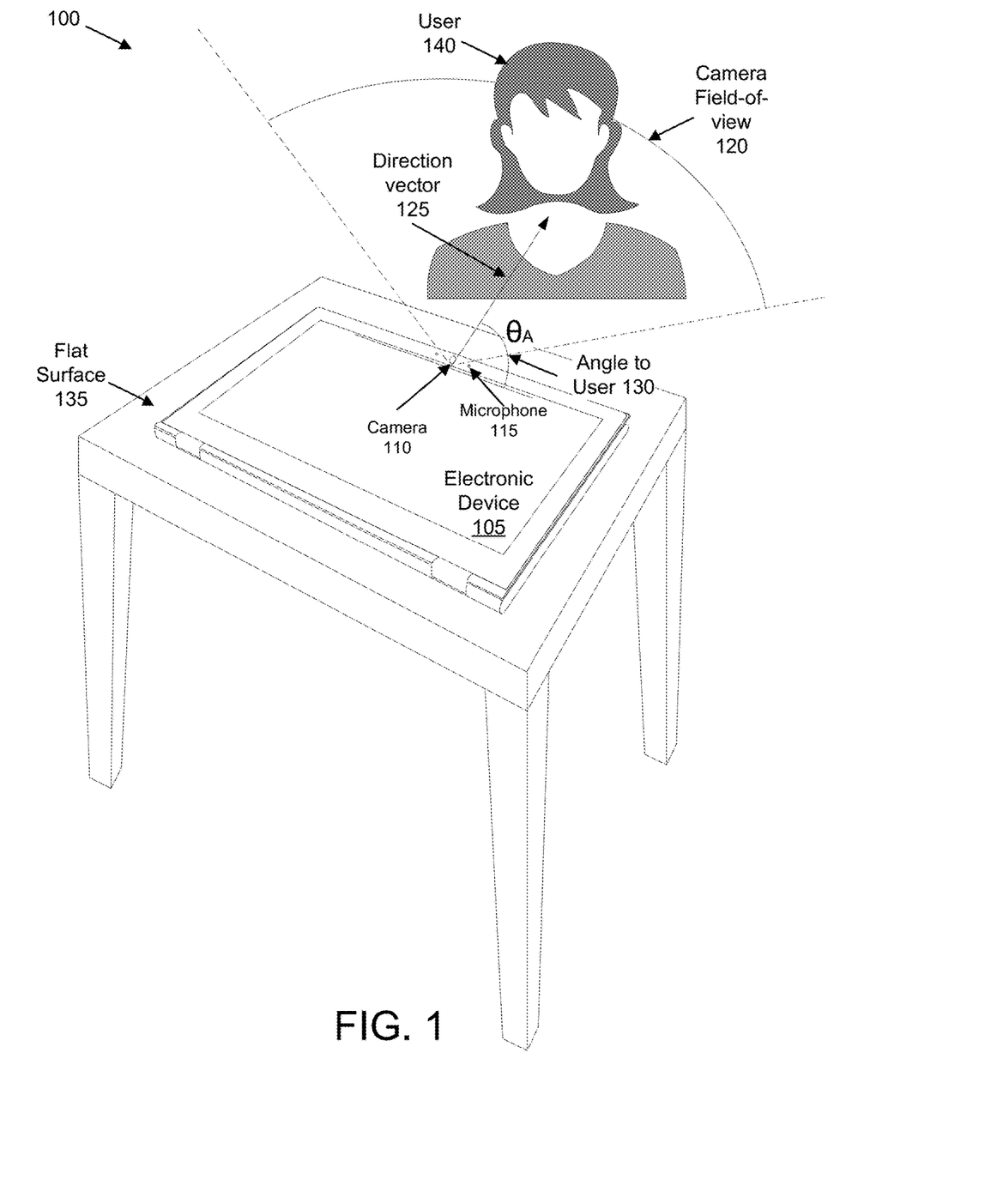
FIG. 1 is a schematic block diagram illustrating one embodiment of a system for using image data to adjust a microphone setting.

FIG. 1 depicts a system 100 for using image data to adjust a microphone setting, according to embodiments of the disclosure. The system 100 includes an electronic device 105. The electronic device 105 includes a camera 110 and a directional microphone 115. In various embodiments, the directional microphone 115 comprises an array of microphone transducers capable of beamforming audio data.

The camera 110 captures image data in its field of view 120. Here, the electronic device 105 analyzes the image data to identify the user 140 and a location of the user 140 relative to the electronic device 105, e.g., relative to the directional microphone 115. In the depicted embodiment, the microphone 115 is located near enough to the camera 110 that the location of the user 140 relative to the microphone may be estimated using a location of the user 140 relative to the camera 110 (e.g., vectors to the user are approximately the same).

In one embodiment, the electronic device 105 calculates a direction vector 125 pointing from the camera 110 or directional microphone 115 to the user 140. Using the direction vector 125, the electronic device may determine the angle-to-the-user 130. The electronic device 105 adjusts a directionality of the microphone to point in the angle-to-the-user 130.

In various embodiments, the electronic device 105 captures the image data and adjusts the directionality of the microphone 115 in response to being set down on a flat surface 135 (e.g., a table). Here, the electronic device 105 may monitor the orientation of the microphone and adjust one or more settings corresponding to the directionality of the microphone 115 to amplify audio pickup in the direction of the angle-to-the-user 130 and to suppress audio pickup in other directions.

In the depicted embodiment, the camera 110 may turn on when the electronic device 105 detects that it is being placed down on the flat surface 135. In various embodiments, the electronic device 105 uses facial recognition to know where the user 140 is located in relationship to the microphone 115. In one embodiment, the location is in relation to a top dead center orientation of the electronic device 105. Consequently, voice input beam forming may be adjusted for maximum pickup at the direction of the user 140 (e.g., angle-to-the-user 130) and maximum noise reduction in other directions.

The electronic device 105 may be any battery-powered device capable of adjustable microphone directionality (e.g., having a microphone array for voice input beamforming). In some embodiments, the electronic device 105 may be a portable computing device, including, but not limited to, a mobile phone, a smart phone, a tablet computer, a laptop computer, a handheld computer, a wearable computer, a gaming console, or the like. In other embodiments, the electronic device 105 may be voice recorder, a hands-free device, a navigation device, a conferencing system, or the like.

As discussed in greater detail herein, the electronic device 105 receives a trigger to adjust the directionality of the microphone 115. In one embodiment, the trigger comprises detecting that the electronic device 105 is being set down. In certain embodiments, the electronic device 105 may need to be in a certain operating mode (e.g., tablet mode) for triggering the directionality adjustment. In another embodiment, the trigger may comprise detecting the user 140 (e.g., using facial recognition).

If the camera 110 is not already capturing image data, then the electronic device 105 activates the camera 110 and captures image data in response to the trigger. For example, the camera 110 may capture one or more still images after the electronic device 105 detects that it is set down on the flat surface 135. As another example, the camera 110 may capture video data in response to the user 140 changing the operation mode of the electronic device 105 (e.g., changing to tablet mode). In certain embodiments, the electronic device 105 powers off the camera 110 after identifying the location of the user relative to the microphone 115. In other embodiments, the camera 110 continues to capture image data, for example to detect a change in the location of the user 140 relative to the microphone 115. Here, the image data may be used to track the location of the user 140 relative to the microphone 115 and to dynamically adjust the directionality of the microphone 115 as the angle-to-the-user 130 changes.

Figure 2:
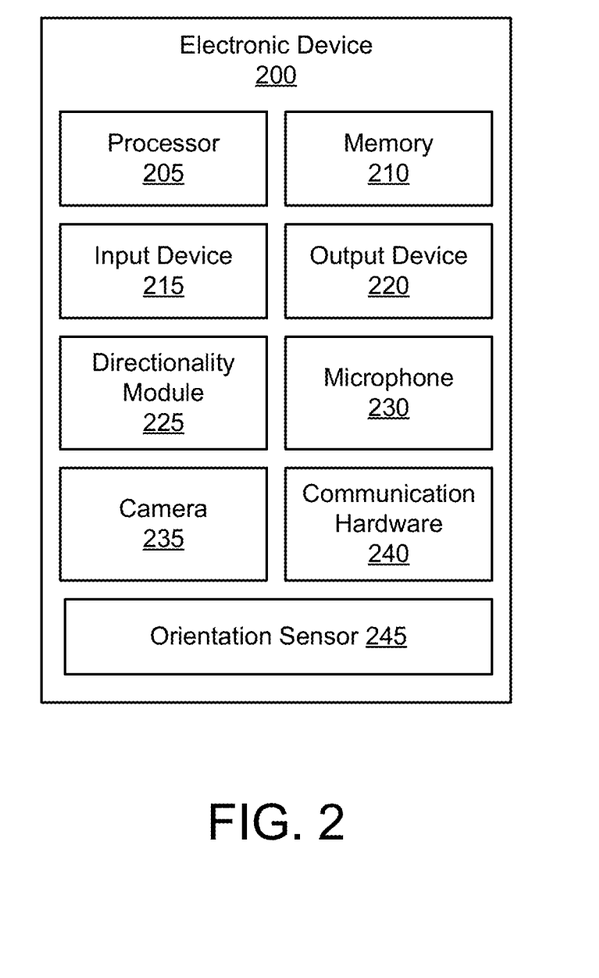
FIG. 2 is a schematic block diagram illustrating one embodiment of an apparatus for using image data to adjust a microphone setting.

FIG. 2 depicts an electronic device 200 for using image data to adjust a microphone setting, according to embodiments of the disclosure. The electronic device 200, may be one embodiment of the electronic device 105. The electronic device 200 may include a processor 205, a memory 210, an input device 215, an output device 220, a directionality module 225, a microphone 230, a camera 235, communication interface 240 and an orientation sensor 245. In certain embodiments, the electronic device 200 contains the processor 205, the memory 210, the directionality module 225, the microphone 230, and the camera 235, but does not include one or more of: the input device 215, the output device 220, the communication interface 240 and/or the orientation sensor 245.

The electronic device 200 may include a body or an enclosure, with the components of the electronic device 200 being located within the enclosure. In various embodiments, the electronic device 200 includes a battery or power supply that provides electrical power to the electronic device 200. Moreover, the components of the electronic device 200 are communicatively coupled to each other, for example via a computer bus.

The processor 205, in one embodiment, may comprise any known controller capable of executing computer-readable instructions and/or capable of performing logical operations. For example, the processor 205 may be a microcontroller, a microprocessor, a central processing unit (CPU), a graphics processing unit (GPU), an auxiliary processing unit, a FPGA, or similar programmable controller. In some embodiments, the processor 205 executes instructions stored in the memory 210 to perform the methods and routines described herein. The processor 205 is communicatively coupled to the memory 210, the input device 215, the output device 220, the directionality module 225, the microphone 230, the camera 235, and the communication interface 240.

The memory 210, in one embodiment, is a computer readable storage medium. In some embodiments, the memory 210 includes volatile computer storage media. For example, the memory 210 may include a random-access memory ("RAM"), including dynamic RAM ("DRAM"), synchronous dynamic RAM ("SDRAM"), and/or static RAM ("SRAM"). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data relating to using image data to adjust a microphone setting. For example, the memory 210 may store image data, user location, microphone settings, and the like. In some embodiments, the memory 210 also stores program code and related data, such as an operating system operating on the electronic device 200. In one embodiment, the directionality module 225 may be embodied in a software application (or set of software applications) stored in the memory 210 and operating on the electronic device 200 (e.g., running on the processor 205).

The input device 215, in one embodiment, may comprise any known computer input device including a touch panel, a button, a keyboard, and the like. In some embodiments, the input device 215 (or portion thereof) may be integrated with the output device 220, for example, as a touchscreen or similar touch-sensitive display. In some embodiments, the input device 215 comprises two or more different devices, such as a button and a touch panel.

The output device 220, in one embodiment, is configured to output visual, audible, and/or haptic signals. In some embodiments, the output device 220 includes an electronic display capable of outputting visual data to a user. For example, the output device 220 may include an LCD display, an LED display, an OLED display, a projector, or similar display device capable of outputting images, text, or the like to a user. In certain embodiments, the output device 220 includes one or more speakers for producing sound, such as an audible alert or notification. In some embodiments, the output device 220 includes one or more haptic devices for producing vibrations, motion, or other haptic output.

In some embodiments, all or portions of the output device 220 may be integrated with the input device 215. For example, the input device 215 and output device 220 may form a touchscreen or similar touch-sensitive display. As another example, the input device 215 and output device 220 may form a display that includes haptic response mechanisms. In other embodiments, the output device 220 may be located near the input device 215. For example, the microphone 230, camera 235, speakers, and touchscreen may all be located on a common surface of the electronic device 200. The output device 220 may receive instructions and/or data for output from the processor 205 and/or the directionality module 225.

The directionality module 225, in one embodiment, is configured to capture image data via the camera 235, use the image data to determine a location of a user relative to the electronic device 200, for example relative to the microphone 230, and adjust a microphone setting for direction-of-amplification based on the location of the user.

In various embodiments, adjusting the microphone setting for direction-of-amplification comprises adjusting a directionality of the directional microphone to acquire audio signals in a direction vector to the user. In one embodiment, adjusting the microphone setting for direction-of-amplification includes the directionality module 225 selecting a beam for the microphone using the location of the user. In another embodiment, adjusting the microphone setting for direction-of-amplification includes the directionality module 225 adjusting the aim of a beam (e.g., adjusting the direction of a main lobe).

In some embodiments, determining the location of the user relative to the electronic device comprises identifying an angular location of the user relative to the microphone array, wherein adjusting the microphone setting for direction-of-amplification comprises estimating an angle-of-arrival ("AoA") of the audio signals based on the angular location and increasing microphone sensitivity in the direction of the AoA.

In certain embodiments, determining the location of the user relative to the electronic device comprises identifying a direction vector pointing to the user. In some embodiments, the directionality module 225 detects a change in user location and re-adjusting the direction-of-amplification of the microphone in response to the change in user location.

The microphone 230 comprises an electronically-adjustable directional microphone. In various embodiments, the microphone 230 comprises an array two or more microphones configured to detect audio signals. In certain embodiments, the microphone comprises a linear array of microphone elements. In some embodiments, the microphone 230 is a beamforming microphone. In various embodiments, the user inputs sound or voice data (e.g., voice commands) via the microphone array.

The camera 235, in one embodiment, is configured to receive image data. As depicted in FIG. 1, the camera 235 may be located near the microphone 230. In certain embodiments, the camera 235 captures the images in response to a change in orientation of the electronic device 200. In certain embodiments, the camera 235 captures the images in response to a change in operation mode of the electronic device 200.

The communication interface 240 may include hardware circuits and/or software (e.g., drivers, modem, protocol/network stacks) to support wired or wireless communication between the electronic device 200 and another device or network. The wireless connection may include a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The orientation sensor 245 is configured to determine an orientation of the electronic device 200. In various embodiments, the orientation sensor 245 is located near the microphone 230, so that the orientation sensor 245 detects an orientation of the microphone 230. In some embodiments, the orientation sensor 245 comprises an acceleration sensor, such as a multi-axis acceleration sensor. In some embodiments, the orientation sensor 245 comprises a gyroscope, such as a multi-access gyro sensor.

Figure 3:
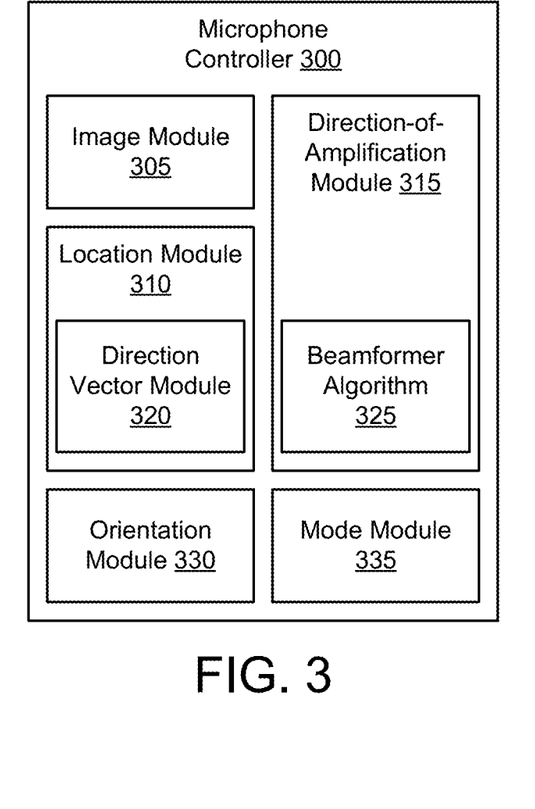
FIG. 3 is a schematic block diagram illustrating one embodiment of a microphone controller for using image data to adjust a microphone setting.

FIG. 3 depicts a microphone controller 300 for using image data to adjust a microphone setting, according to embodiments of the disclosure. The microphone controller 300 may be one embodiment of the directionality module 225, discussed above. Further, the microphone controller 300 may be implemented on an electronic device, such as the electronic device 105 and/or electronic device 200. In one embodiment, the controller 300 may be implemented as a hardware circuit comprising custom VLSI circuits or gate arrays, off-the-shelf semiconductors such as logic chips, transistors, or other discrete components. The controller 300 may also be implemented in programmable hardware devices such as field programmable gate arrays, programmable array logic, programmable logic devices or the like.

As depicted, the microphone controller 300 includes a plurality of modules. Specifically, the microphone controller 300 may include an image module 305, a location module 310, and a direction-of-amplification ("DOA") module 315. In certain embodiments, the microphone controller 300 may also include one or more of: a direction module 320, a beamformer algorithm 325, an orientation module 330, and a mode module 335. The modules 305-335 may be implemented as hardware, software, or a combination of hardware and software.

The image module 305, according to various embodiments, may be configured to capture image data. In various embodiments, the image module 305 interfaces with a digital camera, such as the camera 235, to capture the image. Capturing the image data may occur in response to (e.g., be triggered by) a change in orientation of the electronic device. Alternatively, capturing the image data may be triggered by a change in operation mode of the electronic device.

In certain embodiments, the image module 305 captures still images of the user. In other embodiments, the image module 305 captures video data (e.g., a sequence of still images) of the user. In various embodiments, the image data may be used to track a location of the user within the field-of-view of the camera.

The location module 310, according to various embodiments, may be configured to determine a location of a user relative to the electronic device based on the image data. In certain embodiments, determining the location of the user relative to the apparatus includes identifying an angular location of the user relative to the directional microphone and estimating an angle-of-arrival ("AoA") of incoming audio signals using the angular location.

The DOA module 315, according to various embodiments, may be configured to may be configured to adjust one or more microphone settings for direction-of-amplification based on the location of the user. Adjusting the phone settings for direction-of-amplification may include adjusting one or more of: beam direction aim, beamforming algorithm, amplification levels, and interference patterns.

In some embodiments, the microphone is a beamforming microphone and the DOA module 315 adapts parameters of the beamforming algorithm based on the user's location or selects a different beamforming algorithm based on the user's location. In certain embodiments, the DOA module 315 selects a beamforming algorithm based on a screen orientation of the electronic device. Here, one algorithm may be used with a portrait screen orientation and a different algorithm used with a landscape algorithm. In some embodiments, the microphone is an electronically-adjustable directional microphone and the DOA module 315 adjusts a directionality of the microphone based on the user's location. In some embodiments, the microphone may include a linear array of microphone elements.

The direction module 320, according to various embodiments, may be configured to identify a direction vector pointing from the microphone to the user. In various embodiments, the microphone is located near the camera, so that a directional vector from the camera to the user approximates the direction vector from the microphone to the user. Here, the direction vector comprises an angle-to-the-user (e.g., an angle-of-arrival) and a magnitude. However, in various embodiments the direction vector magnitude may be ignored.

In various embodiments, identifying the direction vector includes identifying an angular location of the user relative to the camera and/or the directional microphone. Here, the direction vector may be based on an AoA estimated using the angular location. In such embodiments, the DOA module 315 may increase microphone sensitivity in a direction indicated by the AoA.

The beamformer algorithm 325, according to various embodiments, processes incoming audio signals to amplify audio pickup in a specific direction (referred to as "direction-of-amplification" and reduce audio pickup in other directions. The beamformer algorithm has one or more parameters that can be adjusted to change the direction-of-amplification. The beamforming algorithm operates on incoming audio signals picked up by two or more microphones (e.g., two or more microphone elements comprising a microphone array). By adjusting the phases of the audio signal received at each microphone (e.g., adding time delay to the signals) and then combining the adjusted signals, the beamformer generates directional signal reception. In certain embodiments, the beamformer algorithm adjusts magnitudes of the audio signal received at each microphone (e.g., amplifying or reducing individual signals). Based on the location of the user relative to the microphone array, one or more parameters of the beamformer algorithm 325 may be adjusted to amplify audio pickup in the direction of the user while suppressing audio pickup in other directions.

Adjusting parameters of a beamforming algorithm may include adjusting an amount of delay added to signals from each microphone. In some embodiments, adjusting one or more parameters of a beamforming algorithm includes adjusting an amplification level of audio signals received by each microphone. In various embodiments, these parameters are adjusted to achieve different beam direction aim, different amplification, and/or different interference patterns (affecting size and shape of the main lobe(s) and sidelobes and the locations of nulls). In some embodiments, the direction-of-amplification module 315 adjusts the direction-of-amplification by adapting a different beamforming algorithm 325.

The orientation module 330, according to various embodiments, may be configured to detects an orientation of the electronic device (e.g., with respect to gravity). In some embodiments, the orientation module 330 processes data from an orientation sensor (e.g., multi-axis accelerometer) to determine the orientation. In some embodiments, orientation module 330 processes image data from a camera located near the microphone to determine the orientation.

In various embodiments, microphone adaptation is triggered whenever the orientation module 330 detects certain orientations of the electronic device. For example, the orientation module 330 may detect that the apparatus is laying flat (e.g., on a flat surface), such that the directional microphone is pointing upwards. In certain embodiments, the orientation module 330 detects an orientation of the directional microphone. Here, the orientation module 330 may detect that the microphone is pointed in the upward direction (e.g., the direction normal to the ground) or within a predetermined range (e.g., within 15° or 30°) of the upward direction.

When the certain orientation is detected, the orientation module 330 may signal other modules in the electronic device, thereby triggering microphone adaptation using image data. In one embodiment, detecting the flat orientation triggers the image module 305 to capture image data and the location module 310 to determine the user's location relative to the electronic device. In another example, the DOA module 315 may adjust the microphone settings for direction-of-amplification in response to the orientation module 330 detecting that the apparatus is placed on a flat surface.

The mode module 335, according to various embodiments, may be configured to detect an operation mode of the electronic device. In some embodiments, the operation mode indicates a physical arrangement of the electronic device. One example of an electronic device is a '2-in-1' notebook computer with four operation modes (also referred to a 'usage modes'): 'laptop mode' where the display is arranged at an angle to the body as conventional laptop with a keyboard facing up, a 'theater mode' (also referred to as 'stand mode' where the display is arranged at an angle to the body with the keyboard facing down, 'tablet mode' where the display is arranged parallel to the body with the keyboard facing opposite the display, and 'presentation mode' (also referred to as 'tent mode') where the display is arranged at an angle to the body similar to the theater mode, but with the notebook computer resting on the edges of the display and body forming a tent shape. In this example, the microphone may use default (static) beamforming settings to capture audio at an angle perpendicular to the display (e.g., AoA of 90°) when in the 'laptop mode,' 'theater mode,' and 'presentation mode.' However, in this example the mode module 335 may detect that the notebook computer is arranged in 'tablet mode' and trigger directional microphone adaptation using image data, e.g., causing the DOA module 315 to adjust the microphone settings for direction-of-amplification in response to the mode module 335 detecting that the apparatus is in the 'tablet mode'.

In other embodiments, the mode module 335 detects a software mode of the electronic device. For example, an operating system running on the electronic device may have a tablet mode, wherein the mode module 335 detects when the (software) operation mode is the 'tablet mode.' Again, in response to detecting that the operation mode is the 'tablet mode,' the mode module 335 may trigger directional microphone adaptation using image data, e.g., causing the DOA module 315 to adjust the microphone settings for direction-of-amplification in response to the mode module 335 detecting that the apparatus is in the 'tablet mode'.

Figure 4:
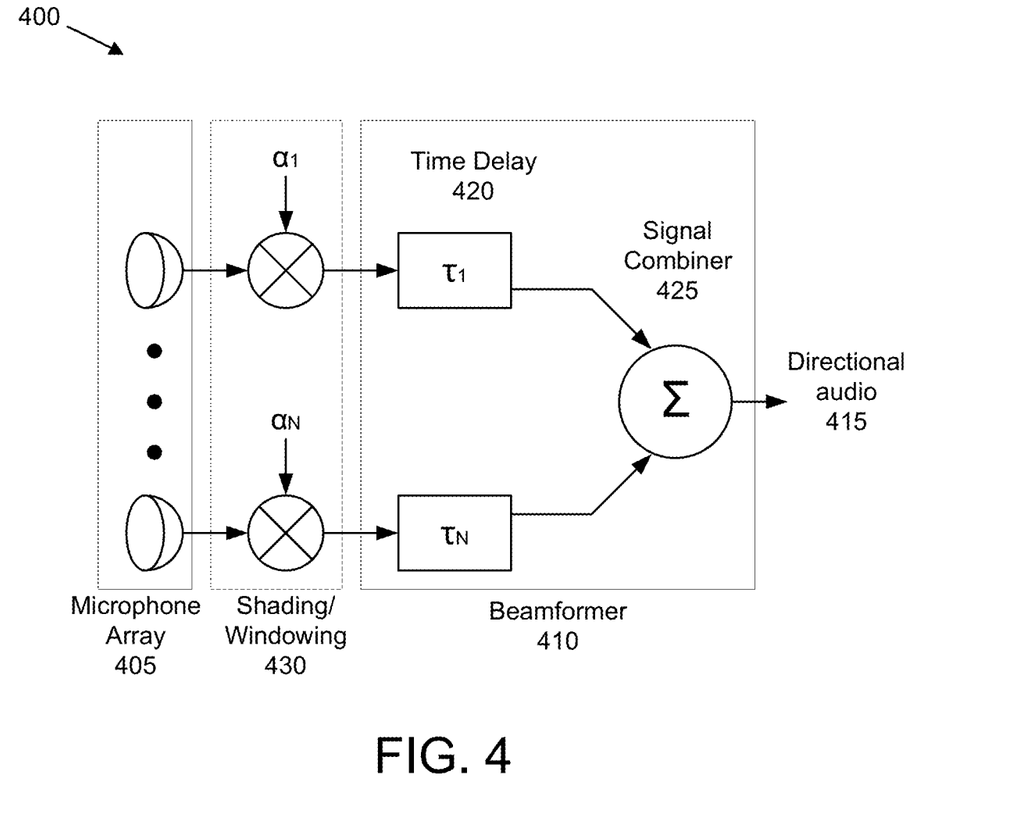
FIG. 4 is a diagram illustrating a microphone array and beamformer.

FIG. 4 depicts one example of a beamforming microphone 400, according to embodiments of the disclosure. The beamforming microphone 400 includes a microphone array 405 and a beamformer 410. The microphone array 405 comprises a plurality of microphone elements. In various embodiments, the microphone elements are transducer elements that are substantially similar to one another. Here, each transducer may have an omnidirectional pickup response (e.g., equally sensitive to sound coming in from all directions). The microphone elements are arranged into an array. In certain embodiments, the microphone array 405 comprises a linear array of microphone elements (transducers). In other embodiments, other arrangements may be used, such as curve, triangular, etc.

The beamformer 410 produces directional audio 415 from the signals received by each microphone element in the microphone array 405. Here, the beamformer 410 may include one or more time-delay elements 420. In one embodiment, there are equal numbers of time-delay elements and transducers (e.g., one time-delay element for each transducer). By varying the amount of time-delay added to each audio input signal from the transducer, the beamformer 410 affect the interference patterns produced by the individual signals from the transducer. After passing through the time-delay stage, the audio signals from the transducers are combined at the signal combiner 425 to produce the directional audio 415.

In various embodiments, the amount of time delay is set to a default amount configured to point the microphone directionality in a direction straight ahead of the display (e.g., top dead center to the display). For a linear array, the default time delay may be the same for each time-delay element 420 in order to point the main lobe in a direction perpendicular to the microphone array 405. However, for situations where the user cannot be assumed to be directly in front of the display, the amount of time delay may be adjusted based on a location of the user relative to the microphone array, thus adjusting the microphone directionality to point towards the user.

In certain embodiments, the beamforming microphone 400 includes a shadowing stage 430. Here one or more shadowing elements may shade transducer output to improve with directionality of the beamforming microphone 400. Here, the shadowing element (e.g., a mixer) multipliers each transducer output by a factor α thereby adjusting the amplitude of the transducer output.

Figure 5:
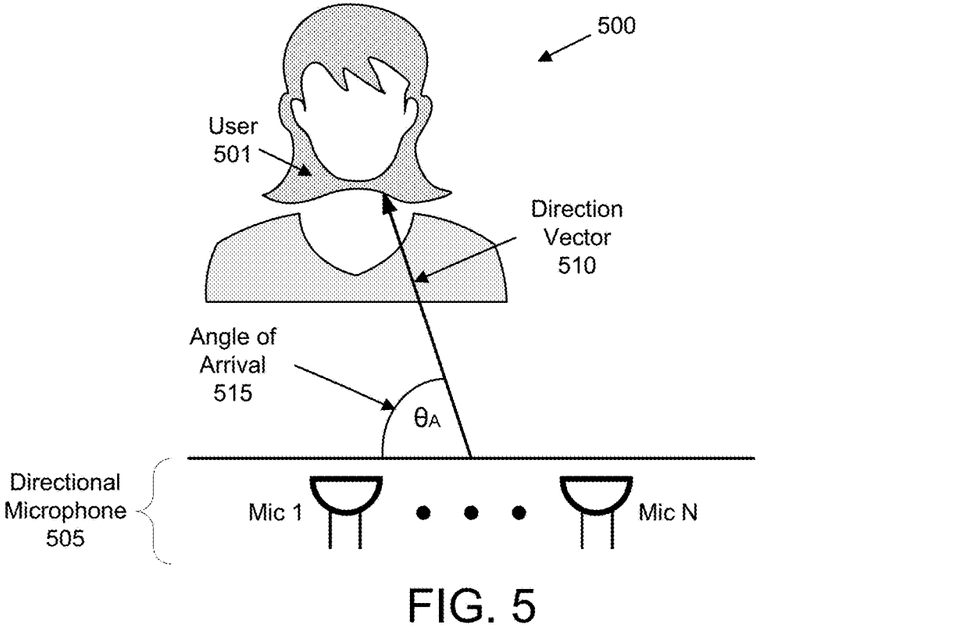
FIG. 5 is a diagram illustrating a directional microphone.

FIG. 5 depicts one example of a system 500 with a directional microphone 505 having adjustable directionality. The directional microphone 505 includes a plurality of microphone elements (e.g., transducers), for example arranged in an array. The directional microphone 505 may be embodied in the electronic device 105. Here, camera data is used to identify a direction to the user 501, indicated here by the direction vector 510. In various embodiments, the direction vector 510 may be calculated using a location of the user 501 relative to the directional microphone 505. Moreover, the direction vector 510 corresponds to an estimated angle of arrival ("AoA") 515 for audio signals produced by the user 501 (e.g., voice).

The directional microphone 505 includes a directionality controller (not shown), such as the directionality module 225, microphone controller 300, and/or the beamformer 410, that adjusts the direction-of-amplification (directionality) to amplify audio pickup in the direction of the estimated AoA 515 and to suppress audio pickup in other directions. Accordingly, the directional microphone 505 is able to effectively pickup sounds from the user 501 even though she is located off-axis (i.e., AoA is not 90°).

Figure 6:
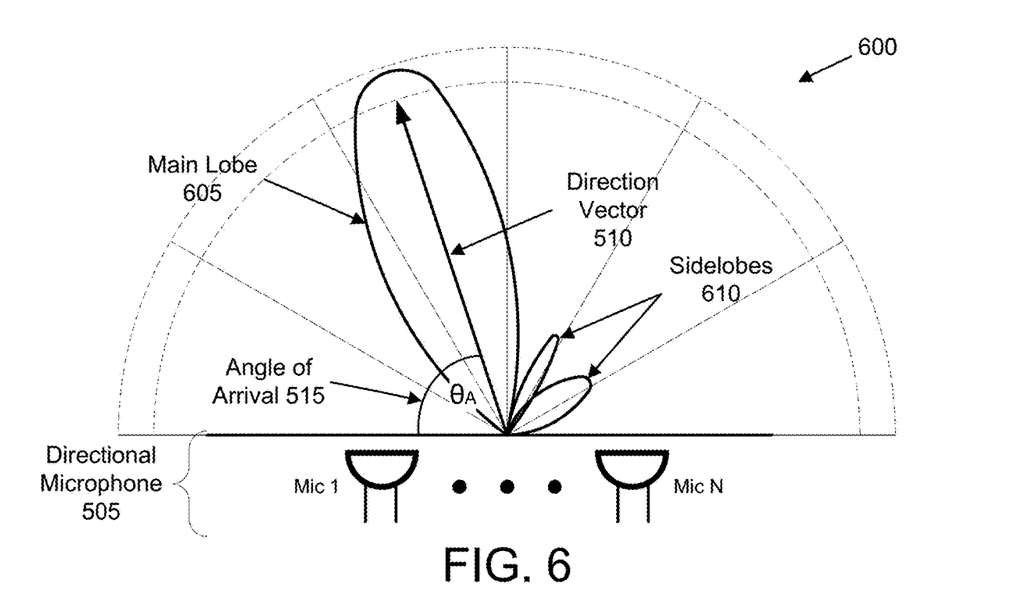
FIG. 6 is a diagram illustrating a microphone response plot.

FIG. 6 depicts a polar plot 600 of directional response of the directional microphone 505. Here, beamforming signals of the directional microphone 505 based on the estimated AoA 515 results in a main lobe 605 extending in the direction of the user. Note that the directional response includes one or more sidelobes 610, which are much smaller in sensitivity, and nulls between the various lobes. As depicted, the directional microphone 505 is configured to amplify audio pickup in the direction of the estimated AoA 515 and to suppress audio pickup in other directions.

Figure 7:
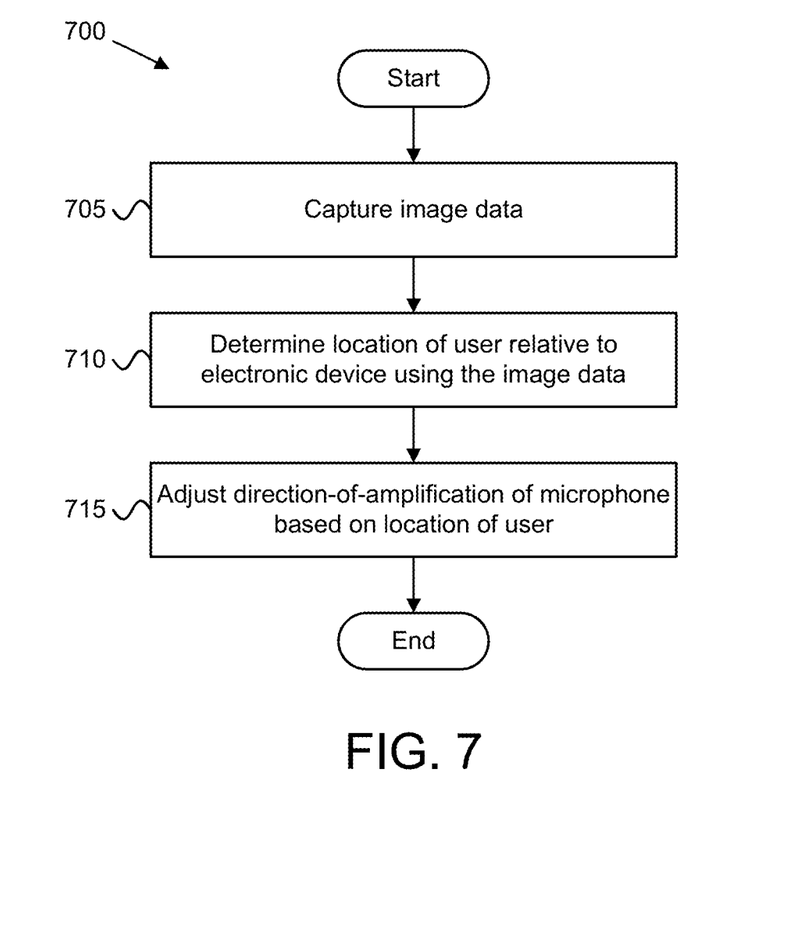
FIG. 7 is a flowchart diagram illustrating one embodiment of a method for using image data to adjust a microphone setting.

FIG. 7 depicts a method 700 for using image data to adjust a microphone setting, according to embodiments of the disclosure. In some embodiments, the method 700 is performed by an electronic device, such as the electronic device 105, the electronic device 200, the directionality module 225, the microphone controller 300, the beamforming microphone 400, and/or the directional microphone 505, described above. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins and capturing 705 image data. The method 700 includes determining 710 a location of a user relative to the electronic device using the image data. The method 700 includes adjusting 715 a direction-of-amplification of a directional microphone based on the based on the location of the user. Here, the electronic device includes the directional microphone. The method 700 ends.

Figure 8:
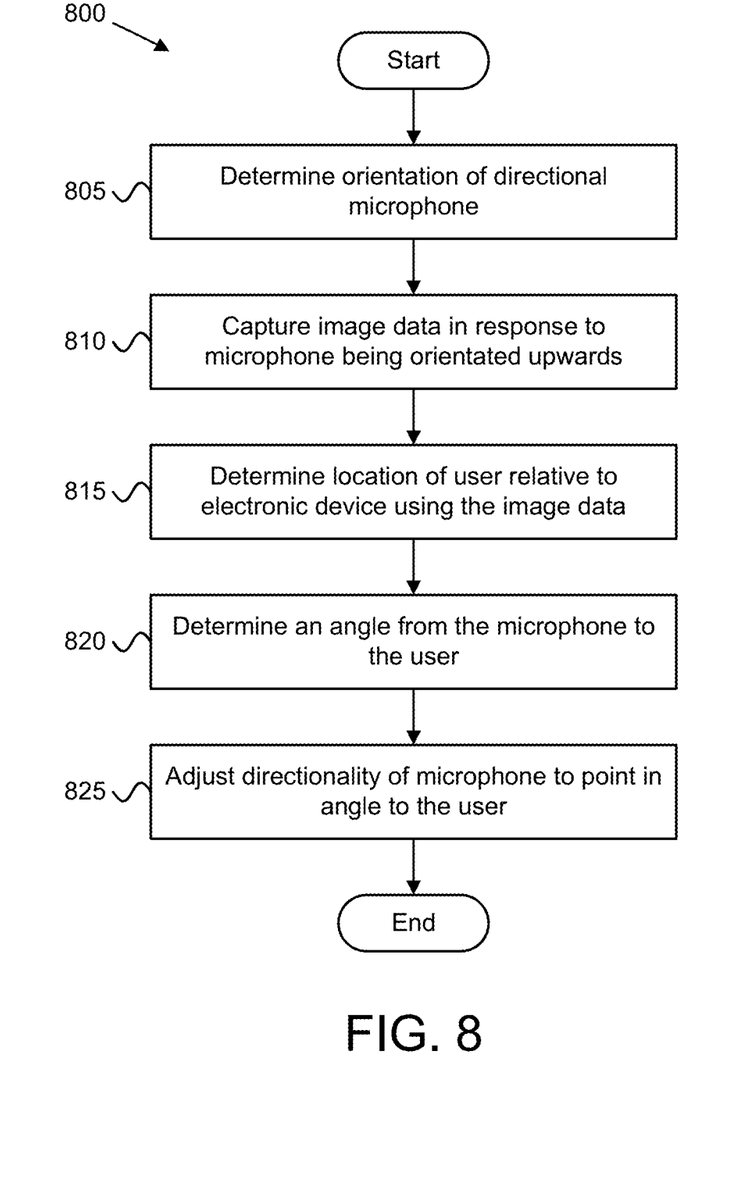
FIG. 8 is a flowchart diagram illustrating another embodiment of a method for using image data to adjust a microphone setting.

FIG. 8 depicts a method 800 for using image data to adjust a microphone setting, according to embodiments of the disclosure. In some embodiments, the method 800 is performed by an electronic device, such as the electronic device 105, the electronic device 200, the directionality module 225, the microphone controller 300, the beamforming microphone 400, and/or the directional microphone 505, described above. In some embodiments, the method 800 is performed by a processor, such as a microcontroller, a microprocessor, a central processing unit (CPU), a graphics processing unit (GPU), an auxiliary processing unit, a FPGA, or the like.

The method 800 begins and determines 805 an orientation of a directional microphone. Here, the orientation may be measured relative to gravity. In response to the directional microphone being directed upwards, the method 800 captures 810 image data. In various embodiments, the upward direction is antiparallel to the direction of gravity. In some embodiments, the microphone is considered to be directed upwards if it is within a predetermined range of the upward direction.

The method 800 includes determining 815 a location of a user relative to the electronic device using the image data. The method 800 includes determining 820 an angle from the microphone to the user. The method 800 includes adjusting 825 the directionality of the microphone to point in the angle from the microphone to the user. The method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a camera that captures image data;
   a directional microphone that captures audio signals;
   an orientation sensor that detects an orientation of the apparatus;
   a processor; and
   a memory that stores code executable by the processor to:
      detect that the apparatus is placed on a flat surface based on input from the orientation sensor; and
      in response to detecting that the apparatus is placed on the flat surface:
         activate the camera and capture image data;
         determine a location of a user relative to a top dead center of the apparatus using the image data; and
         adjust microphone settings for direction-of-amplification based on the location of the user.

2. The apparatus of claim 1, wherein the directional microphone comprises an electronically-adjustable directional microphone, wherein adjusting microphone settings for direction-of-amplification based on the location of the user comprises adjusting a directionality of the directional microphone to acquire audio signals in a direction vector to the user.

3. The apparatus of claim 1, wherein adjusting microphone settings for direction-of-amplification based on the location of the user comprises adjusting one or more of: beam direction aim, beamforming algorithm, amplification levels, and interference patterns.

4. The apparatus of claim 1, wherein adjusting microphone settings for direction-of-amplification based on the location of the user comprises amplifying audio pickup in a direction vector pointing to the location of the user and suppressing audio pickup in other direction vectors.

5. The apparatus of claim 1, wherein determining the location of the user relative to the apparatus comprises identifying an angular location of the user relative to the directional microphone, wherein adjusting microphone settings for direction-of-amplification based on the location of the user comprises estimating an angle-of-arrival ("AoA") of incoming audio signals and increasing microphone sensitivity in the direction of the AoA.

6. The apparatus of claim 1, wherein the camera captures the image data in response to one of: a change in orientation of the apparatus and a change in operation mode of the apparatus.

7. The apparatus of claim 1, wherein the processor further detects a change in user location and re-adjusts the microphone settings for direction-of-amplification in response to the change in user location.

8. The apparatus of claim 6, wherein the operation mode comprises a tablet mode where a display of the apparatus is arranged parallel to a body of the apparatus.

9. A method comprising:
  detecting that an electronic device is placed on a flat surface based on input from an orientation sensor, the electronic device comprising a camera and a directional microphone;
  in response to detecting that the apparatus is placed on the flat surface:
    activating the camera and capturing image data by the electronic device;
    determining, by use of a processor, a location of a user relative to a top dead center of the electronic device based on the image data; and
    adjusting a direction-of-amplification of the directional microphone based on the location of the user.

10. The method of claim 9, wherein the directional microphone comprises an electronically-adjustable directional microphone, wherein adjusting the direction-of-amplification of the directional microphone based on the location of the user comprises adjusting a directionality of the directional microphone to acquire audio signals in a direction vector to the user.

11. The method of claim 9, wherein adjusting the direction-of-amplification of the directional microphone based on the location of the user comprises adjusting one or more of: beam direction aim, beamforming algorithm, amplification levels, and interference patterns.

12. The method of claim 9, wherein adjusting the direction-of-amplification of the directional microphone based on the location of the user comprises amplifying audio pickup in a direction vector pointing to the location of the user and suppressing audio pickup in other direction vectors.

13. The method of claim 9, wherein determining the location of the user relative to the electronic device comprises identifying an angular location of the user relative to the directional microphone, wherein adjusting the direction-of-amplification of the directional microphone based on the location of the user comprises estimating an angle-of-arrival ("AoA") of incoming audio signals and increasing microphone sensitivity in the direction of the AoA.

14. The method of claim 9, wherein capturing the image data occurs in response to one of: a change in orientation of the electronic device and a change in operation mode of the electronic device.

15. The method of claim 9, further comprising detecting a change in user location and re-adjusting the direction-of-amplification of the directional microphone in response to the change in user location.

16. The method of claim 14, wherein the operation mode comprises a tablet mode where a display of the electronic device is arranged parallel to a body of the electronic device.

17. A program product comprising a computer readable storage medium that stores code executable by a processor, the executable code comprising code to:
  detect that an electronic device is placed on a flat surface based on input from an orientation sensor, the electronic device comprising a camera and a directional microphone;
  in response to detecting that the electronic device is placed on the flat surface:
    activate the camera and capture image data via the camera;
    determine, using the image data, a location of a user relative to a top dead center of the electronic device; and
    adjust a microphone setting for direction-of-amplification based on the location of the user.

18. The program product of claim 17, wherein the directional microphone comprises an electronically-adjustable directional microphone, wherein adjusting the microphone setting for direction-of-amplification comprises adjusting a directionality of the directional microphone to acquire audio signals in a direction vector to the user.

19. The program product of claim 17, wherein adjusting the microphone setting for direction-of-amplification comprises adjusting one or more of: beam direction aim, beamforming algorithm, amplification levels, and interference patterns.

20. The program product of claim 17, wherein adjusting the microphone setting for direction-of-amplification comprises amplifying audio pickup in a direction vector pointing to the location of the user and suppressing audio pickup in other direction vectors.

* * * * *